(12) United States Patent
Chien

(10) Patent No.: US 9,778,463 B2
(45) Date of Patent: Oct. 3, 2017

(54) HEAD-UP DISPLAY DEVICE

(71) Applicant: LITE-ON TECHNOLOGY CORPORATION, Taipei (TW)

(72) Inventor: Hung-Chang Chien, Hsinchu County (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 67 days.

(21) Appl. No.: 15/049,780

(22) Filed: Feb. 22, 2016

(65) Prior Publication Data

US 2017/0075123 A1 Mar. 16, 2017

Related U.S. Application Data

(60) Provisional application No. 62/216,479, filed on Sep. 10, 2015.

(51) Int. Cl.
*G09G 5/00* (2006.01)
*G02B 27/01* (2006.01)

(52) U.S. Cl.
CPC .. *G02B 27/0149* (2013.01); *G02B 2027/0156* (2013.01)

(58) Field of Classification Search
CPC .............. G02B 27/0149; G02B 2027/0156
See application file for complete search history.

(56) References Cited

U.S. PATENT DOCUMENTS

| | | | | |
|---|---|---|---|---|
| 2013/0100533 A1* | 4/2013 | Potakowskyj | ..... | G02B 27/0179 359/630 |
| 2013/0100535 A1* | 4/2013 | Ruyten | ..... | G02B 27/0149 359/632 |
| 2015/0362731 A1* | 12/2015 | Hack | ..... | G02B 27/0149 359/632 |
| 2015/0362732 A1* | 12/2015 | Ruyten | ..... | G02B 27/0149 359/632 |
| 2017/0113551 A1* | 4/2017 | Schaellert | ..... | B60K 35/00 |

* cited by examiner

*Primary Examiner* — Adam R Giesy
(74) *Attorney, Agent, or Firm* — Li & Cai Intellectual Property (USA) Office

(57) ABSTRACT

A head-up display device includes a housing, a guiding base, a projecting board assembly, a protecting cover and a driving mechanism. The projecting board assembly is movably arranged at the guiding base. The driving mechanism includes a link, a lever, and a drive wheel. A front end of the link is pivotally connected to the protecting cover, and a rear end of the link is engaged with the drive wheel. A lower end of the lever is pivotally connected to the projecting board assembly. The drive wheel is rotatable and can be selectively engaged with the lever. The rotation of the drive wheel can drive the link and the lever to move and thus drive the protecting cover and the projecting board assembly to move. Therefore, the driving mechanism can be more easily arranged, so as to simplify the structure and reduce cost.

18 Claims, 14 Drawing Sheets

HEAD-UP DISPLAY DEVICE

TECHNICAL FIELD

The present invention provides a head-up display device and particularly a head-up display device having a slidable projecting board assembly.

BACKGROUND ART

A head-up display (HUD) is a device for projecting instrument-related information onto a windshield. Compared to a traditional instrument panel, the HUD enables a driver to see required important information without lowering his/her head. Therefore, the driver can see instrument-related information and watch out for road conditions at the same time.

HUDs having a slidable projecting board assembly have been successively proposed, where vehicle information is displayed by the projecting board assembly which is slid upwards and extended outward, and when the use of the projecting board assembly is stopped, the projecting board assembly is slid downwards and retracted into a housing of an instrument panel assembly. Conventional HUDs are not provided with a protecting cover or a light source protecting cover, so they tend to be exposed to sunshine or adhered with dust, thereby resulting in the damage to the projecting board or the light source element. Some conventional HUDs are provided with a protecting cover, but the arrangement of such a protecting cover necessarily leads to complicated driving mechanisms and increased costs, let alone further arrangement of a light source protecting cover.

In view of the above disadvantages, after an extensive research in conjunction with theoretical knowledge, the inventors provide this invention that is reasonably designed and effectively improves upon the above disadvantages.

SUMMARY OF THE INVENTION

The objective of the present invention is to provide an HUD device, which has a protecting cover, thereby achieving an effect of protecting a projecting board to prevent the projecting board from being exposed to sunshine or adhered with dust. In addition, the arrangement of a driving mechanism is relatively easy, so as to simplify the structure and reduce cost.

In order to achieve the above objective, the present invention provides an HUD device, comprising: a housing provided with an opening; a guiding base located below the housing; a projecting board assembly disposed at the guiding base, the projecting board assembly being slidably movable between a storing position which is located below the opening of the housing and a displaying position which is located outside the housing, the projecting board assembly comprising a holder and a projecting board which is disposed on the holder; a protecting cover disposed at the housing, the protecting cover being slidably movable between a closed position which is located at the opening of the housing and an open position which is located distal from the opening of the housing; and a driving mechanism comprising a link, a lever, and a driving wheel, wherein one end of the link is pivotally connected to the protecting cover, the other end of the link is engaged with the driving wheel, one end of the lever is pivotally connected to the projecting board assembly, and the driving wheel may be selectively engaged with the lever, such that when the driving wheel rotates, the link and the lever may be driven to move, thereby driving the protecting cover and the projecting board assembly to move; wherein when the driving wheel rotates in a direction, the driving wheel drives the link to rotate such that the protecting cover is moved from the closed position to the open position, and the driving wheel drives the lever to swing such that the projecting board assembly is moved from the storing position to the displaying position.

In order to achieve the above objective, the present invention further provides an HUD device, comprising: a housing provided with an opening and a light source aperture; a guiding base located below the housing; a projecting board assembly disposed at the guiding base, the projecting board assembly being slidably movable between a storing position which is located below the opening of the housing and a displaying position which is located outside the housing, the projecting board assembly comprising a holder and a projecting board which is disposed on the holder; a protecting cover disposed at the housing, the protecting cover being slidably movable between a first closed position which is located at the opening of the housing and a first open position which is located distal from the opening of the housing; a light source protecting cover disposed at the housing, the light source protecting cover being pivotally movable between a second closed position which is located at the light source aperture of the housing and a second open position which is located distal from the light source aperture of the housing; and a driving mechanism comprising a link, a lever and a driving wheel, wherein one end of the link is pivotally connected to the protecting cover, the other end of the link is engaged with the driving wheel, one end of the lever is pivotally connected to the projecting board assembly, the other end of the lever is engaged with the light source protecting cover, and the driving wheel is capable of being engaged with the lever, such that when the driving wheel rotates, the link and the lever may be driven to move, thereby driving the protecting cover, the projecting board assembly and the light source protecting cover to move; wherein when the driving wheel rotates in a direction, the driving wheel drives the link to rotate such that the protecting cover is moved from the first closed position to the first open position, and the driving wheel drives the lever to swing such that the projecting board assembly is moved from the storing position to the displaying position and the light source protecting cover is pivoted from the second closed position to the second open position.

The present invention at least has the following advantages:

The projecting board assembly of the present invention comprises the holder and the projecting board, wherein the protecting cover can cover the projecting board of the projecting board assembly, thereby achieving the effect of protecting the projecting board to prevent the projecting board from being exposed to sunshine or adhered with dust. In addition, the rotation of the driving wheel may drive the link and the lever to move and thus drive the protecting cover and the projecting board assembly to move. As such, only one driving wheel is required for driving all the objects, and thus the arrangement of the driving mechanism is relatively easy, so as to simplify the structure and reduce cost.

Furthermore, according to the present invention, the light source protecting cover is further disposed on the housing, and the other end of the lever is engaged with the light source protecting cover, such that the rotation of the driving wheel may drive the lever to move and thus drive the light source protecting cover to move. Thus, no other driving mechanisms are required for driving the light source protecting cover, which also simplifies the structure and reduces cost.

In order to further understand the features and technical content of the present invention, reference can be made to the detailed description and accompanying drawings of the present invention. However, the accompanying drawings are only provided for reference and illustration, but not intended to limit the present invention.

DETAILED DESCRIPTION OF THE PREFERRED EMBODIMENTS

Figure 1:
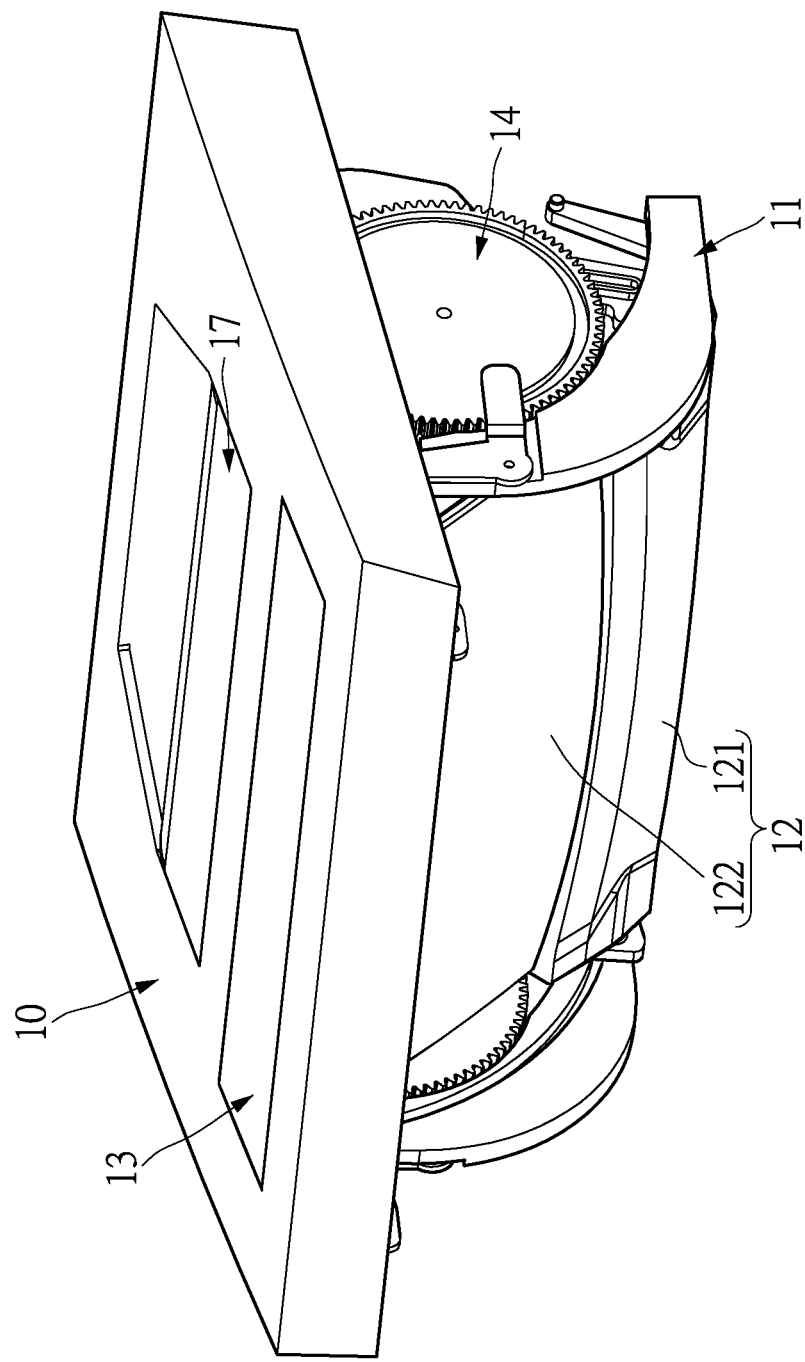
FIG. 1 is a perspective view (1) of an HUD device according to the present invention.
Figure 2:
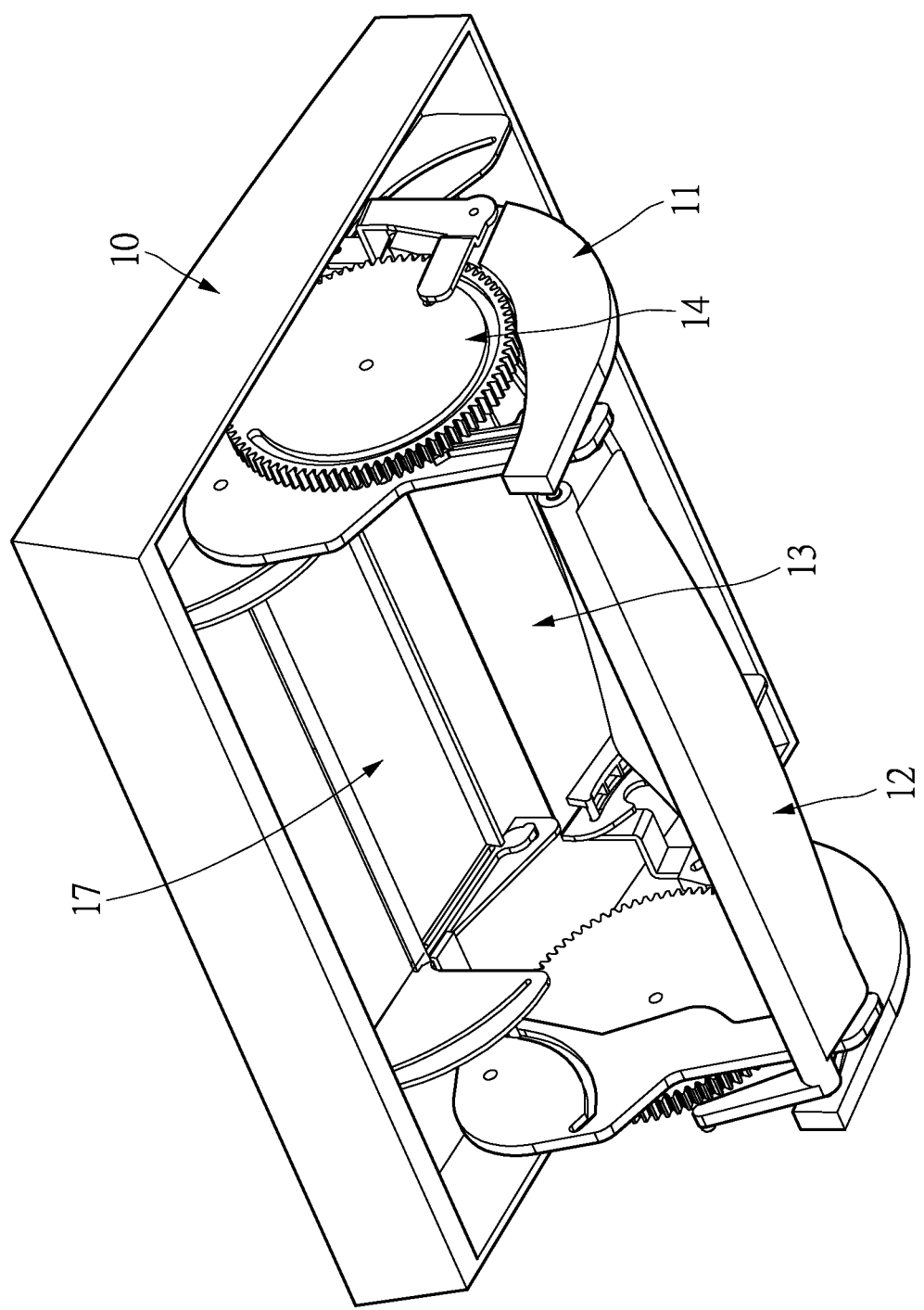
FIG. 2 is a perspective view (2) of the HUD device according to the present invention.

Referring to FIG. 1 and FIG. 2, the present invention provides an HUD device, particularly an HUD device having a slidable projecting board assembly, comprising a housing 10, a guiding base 11, a projecting board assembly 12, a protecting cover 13, and a driving mechanism 14.

Figure 3:
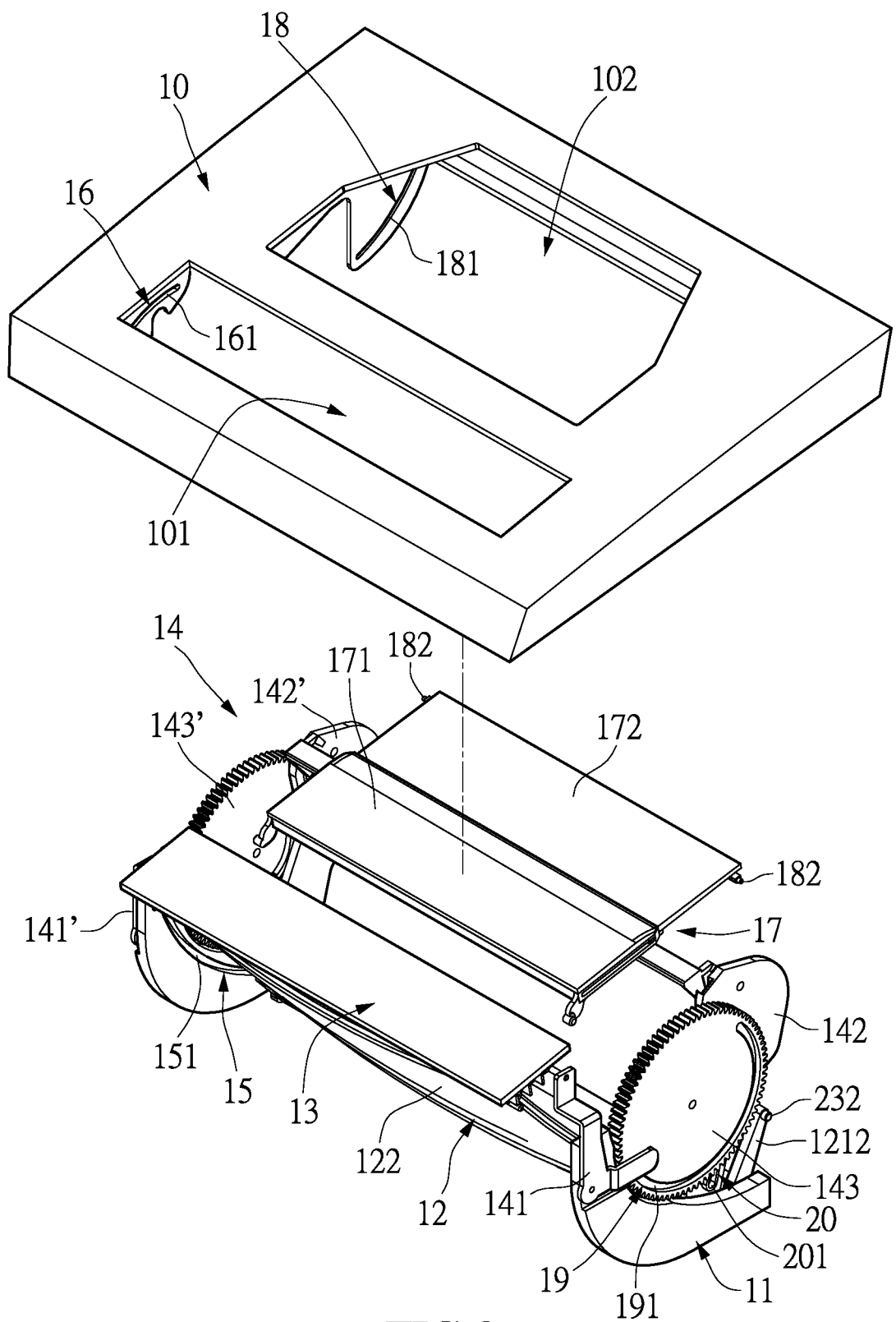
FIG. 3 is a partially exploded view (1) of the HUD device according to the present invention.
Figure 4:
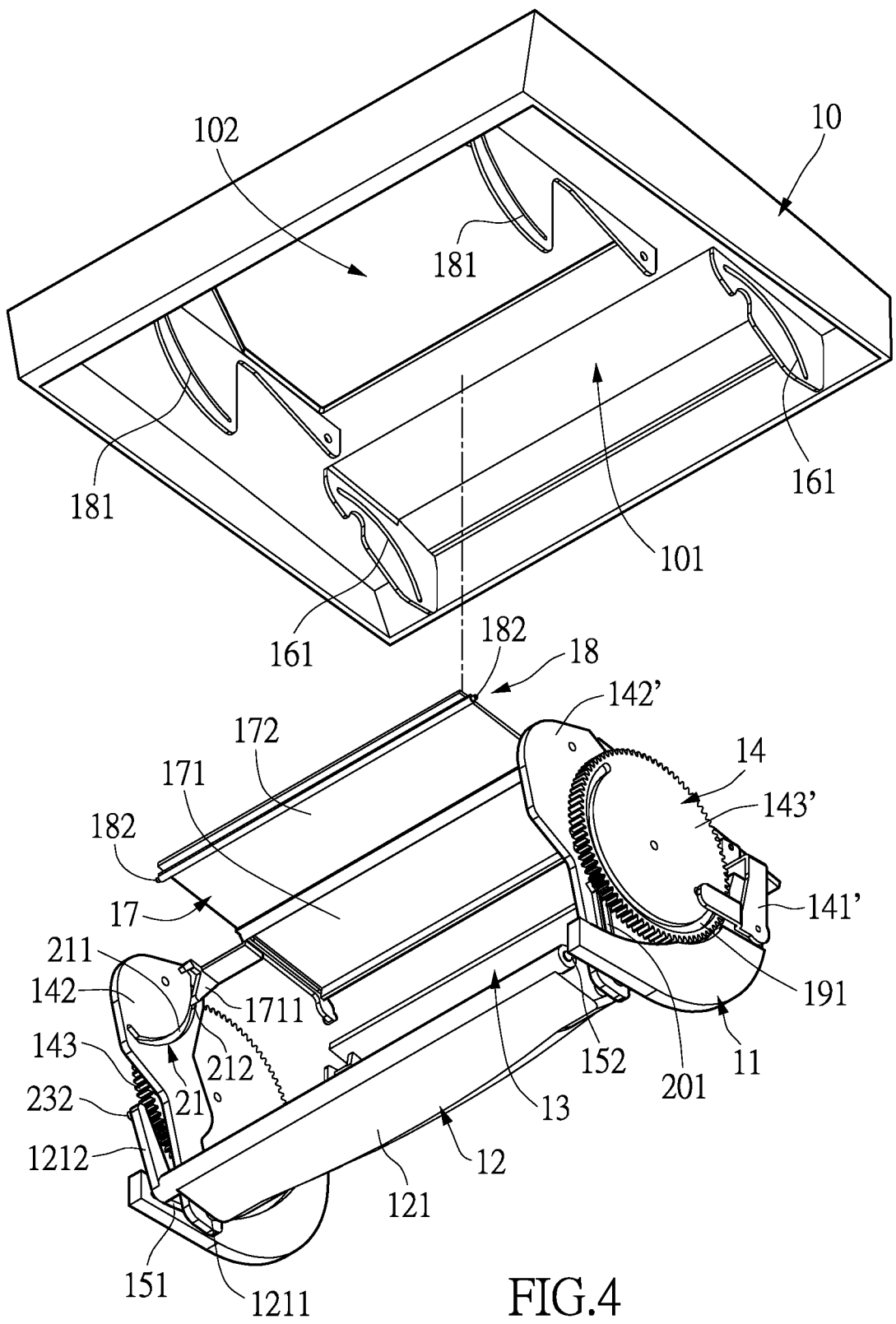
FIG. 4 is a partially exploded view (2) of the HUD device according to the present invention.

Also referring to FIG. 3 and FIG. 4, the housing 10 may be a part of an instrument board housing or may be otherwise combined with the instrument board housing, and may be suitably mounted on a vehicle. The housing 10 is provided with an opening 101.

The guiding base 11 is located below the housing 10. The guiding base 11 in the present embodiment is of a two-piece design, but also may be of a one-piece design, which may suitably vary depending upon the actual design requirements.

The projecting board assembly 12 is slidably disposed at the guiding base 11. The projecting board assembly 12 may be located outside the housing 10 by being slid upward and extended outward through the opening 101 (please refer to FIG. 11), and may be located below the housing 10 by being slid downward and retracted (please refer to FIG. 7). In particular, the projecting board assembly 12 comprises a holder 121 and a projecting board 122. The projecting board 122 is preferably, but not limited to an arc board. The projecting board 122 is disposed on the holder 121, namely, one end of the projecting board 122 may be inserted and fixed to the holder 121 (see FIG. 1) such that the projecting board 122 and the holder 121 are integrally connected, so as to use the holder 121 to drive the projecting board 122 to move synchronously. The holder 121 may be connected to the driving mechanism 14, such that the projecting board assembly 12 may be slidably disposed at the guiding base 11 through the driving of the driving mechanism 14. The detailed construction of the driving mechanism 14 will be described later.

Figure 5:
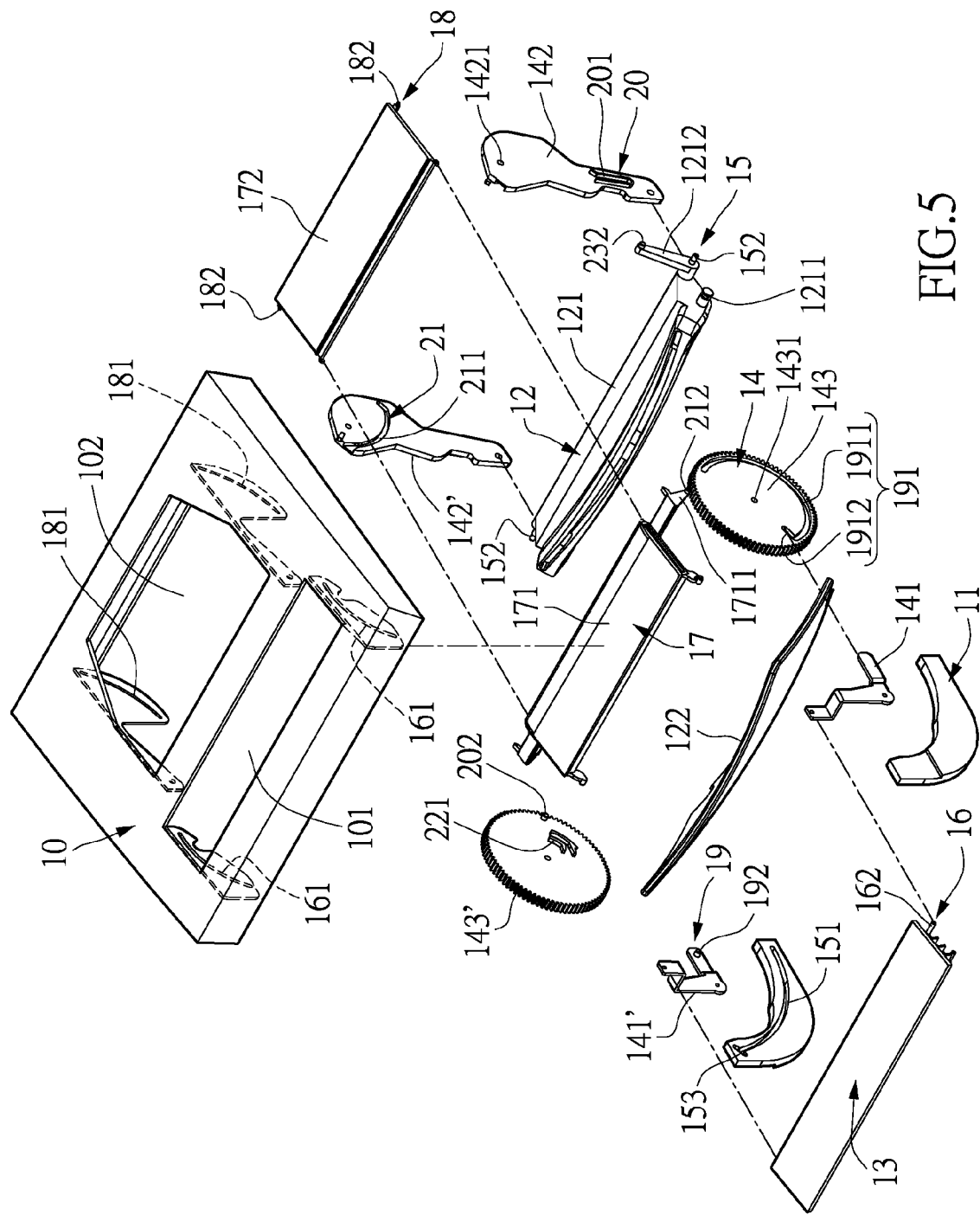
FIG. 5 is an exploded view (1) of the HUD device according to the present invention.
Figure 6:
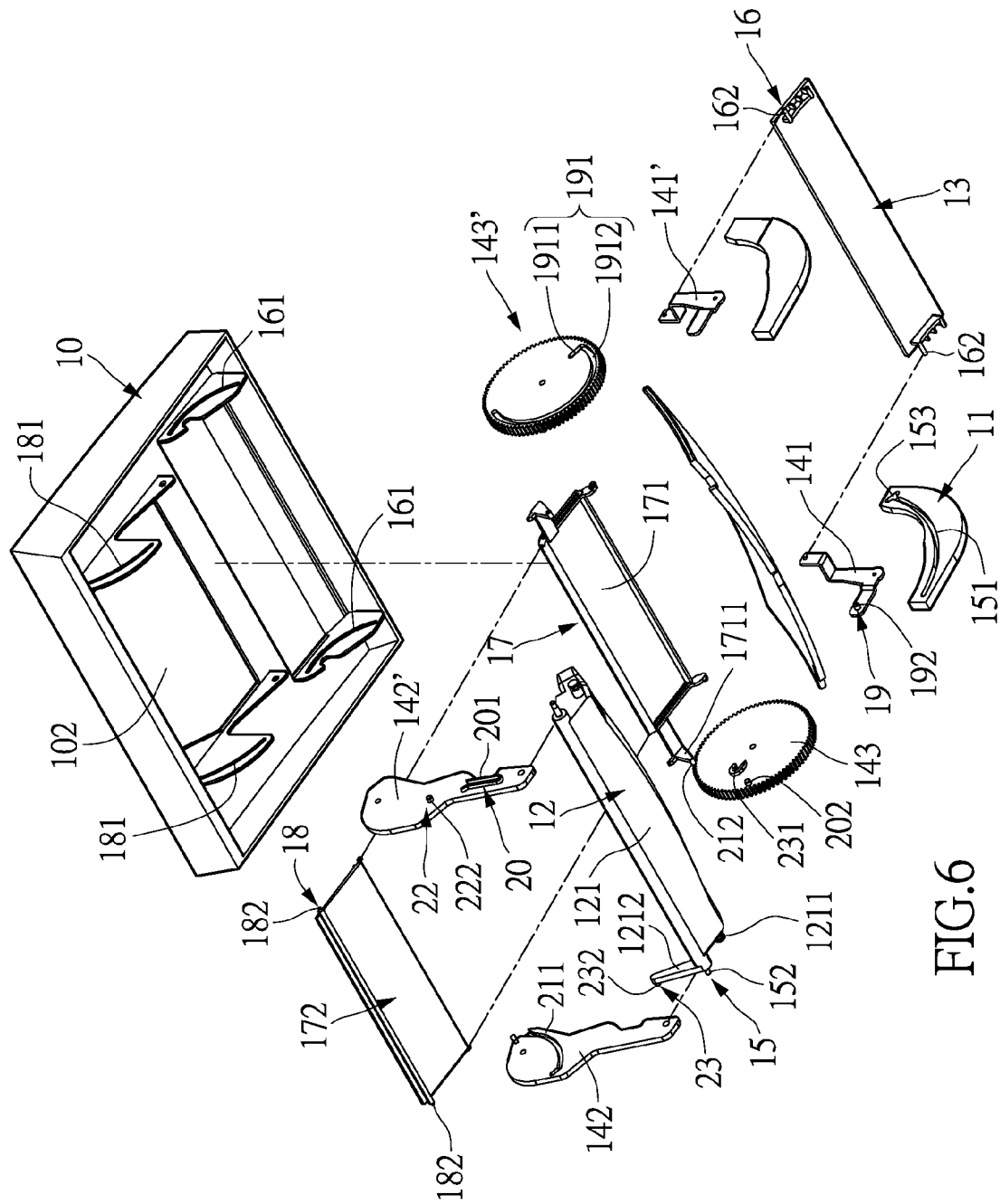
FIG. 6 is an exploded view (2) of the HUD device according to the present invention.
Figure 7:
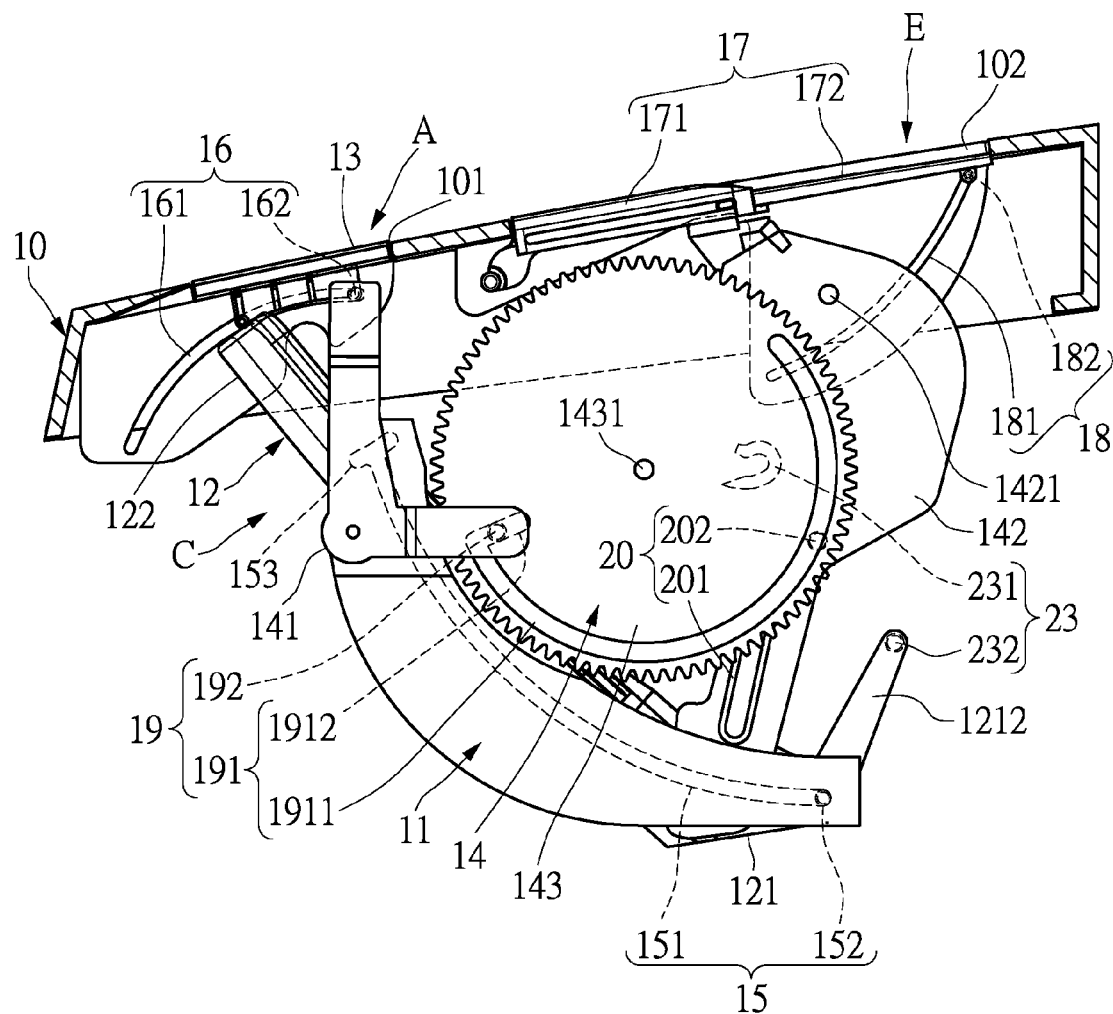
FIG. 7 is a schematic plan view (1) of the HUD device according to the present invention.

Further, referring to FIG. 5 to FIG. 7, a first guiding mechanism 15 (as shown in FIG. 7) is provided between the projecting board assembly 12 and the guiding base 11, for guiding movement of the projecting board assembly 12. The construction of the first guiding mechanism 15 is not limited, and may be a combination of a guiding groove with a guiding post, or a combination of a guiding rail with a guiding block, or other existing guiding mechanisms.

In the present embodiment, the first guiding mechanism 15 comprises a first guiding groove 151 and a first guiding post 152. The first guiding groove 151 is disposed at the inner side of the guiding base 11. The first guiding groove 151 is generally arc-shaped. The first guiding post 152 is disposed at the outer side of the holder 121. The first guiding post 152 is slidably disposed in the first guiding groove 151. The number of the first guiding post 152 may correspond to the number of the first guiding groove 151. As shown in FIGS. 5 and 6, the first guiding post 152 can be disposed at two sides of the holder 121 and the first guiding groove 151 can be disposed at the opposing sides of the guiding base 11. The driving mechanism 14 can drive the projecting board assembly 12 to move under the guidance of the first guiding mechanism 15, which will be described later.

The protecting cover 13 is slidably disposed at the housing 10. The protecting cover 13 is a cover for covering the projecting board 122. The protecting cover 13 can cover the projecting board 122 or uncover to expose the projecting board 122. In particular, the protecting cover 13 may be slid in a direction away from the opening 101 to expose the opening 101 and thus expose the projecting board 122 (please refer to FIG. 9). The protecting cover 13 may be slid in a direction toward the opening 101 to cover the opening 101 and thus cover the projecting board 122 to protect the projecting board 122 (please refer to FIG. 7). The protecting cover 13 may be connected to the driving mechanism 14, such that the protecting cover 13 may be slidably disposed at the housing 10 through the driving of the driving mechanism 14.

Further, a second guiding mechanism 16 (as shown in FIG. 7) is provided between the protecting cover 13 and the housing 10, for guiding movement of the protecting cover 13 at the opening 101. The construction of the second guiding mechanism 16 is not limited, and may be a combination of a guiding groove with a guiding post, or a combination of a guiding rail with a guiding block, or other existing guiding mechanisms.

In the present embodiment, the second guiding mechanism 16 comprises a second guiding groove 161 and a second guiding post 162. The second guiding groove 161 is disposed at the housing 10. The second guiding groove 161 is disposed at the opening 101 of the housing 10. The second guiding groove 161 is generally arc-shaped. The second guiding post 162 is disposed at the protecting cover 13. The second guiding post 162 is disposed at the outer side of the protecting cover 13. The second guiding post 162 is slidably disposed in the second guiding groove 161. The number of the second guiding post 162 may be two or more, and the number of the second guiding groove 161 is two. As shown in FIGS. 5 and 6, the second guiding post 162 can be disposed at two sides of the protecting cover 13 and the second guiding groove 161 can be disposed at two sides of the opening 101. The driving mechanism 14 can drive the protecting cover 13 to move under the guidance of the second guiding mechanism 16, which will be described later.

In the present embodiment, the HUD device further comprises a light source protecting cover 17 (please refer to FIG. 1). The light source protecting cover 17 is pivotally disposed at the housing 10 and the light source protecting cover 17 can cover a light source element (not shown) or uncover to expose the light source element. In particular, the light source protecting cover 17 is an opaque cover plate. The housing 10 is provided with a light source aperture 102. The light source protecting cover 17 may be pivoted downward to expose the light source aperture 102 (please refer to FIG. 11) such that the light source element is exposed from the light source aperture 102, and the light source protecting cover 17 may be pivoted upward to cover the light source aperture 102 (please refer to FIG. 7) such that the light source protecting cover 17 covers the light source element to protect the light source element. The light source protecting cover 17 may be connected to the driving mechanism 14, such that the light source protecting cover 17 may be pivotally disposed at the housing 10 through the driving of the driving mechanism 14, which will be described later.

In the present embodiment, the light source protecting cover 17 is of a two-piece design, namely, the light source protecting cover 17 has a first protecting cover 171 and a second protecting cover 172. The first protecting cover 171 is pivotally disposed on the housing 10, the second protecting cover 172 is telescopically connected to the first protecting cover 171, namely, the second protecting cover 172 may be retracted into the first protecting cover 171 or extended out of the first protecting cover 171 with the pivoting of the first protecting cover 171 (please refer to FIG. 7 and FIG. 11). Of course, the light source protecting cover 17 may be of a one-piece design or also may be a transparent cover plate and is fixedly disposed at the housing 10 and corresponds to the light source element, such that light emitted from the light source element may directly penetrate the light source protecting cover 17.

Further, a third guiding mechanism 18 (as shown in FIG. 7) is provided between the light source protecting cover 17 and the housing 10, for guiding movement of the light source protecting cover 17 at the light source aperture 102. The construction of the third guiding mechanism 18 is not limited, and may be a combination of a guiding groove with a guiding post, or a combination of a guiding rail with a guiding block, or other existing guiding mechanisms.

In the present embodiment, the third guiding mechanism 18 comprises a third guiding groove 181 and a third guiding post 182. The third guiding groove 181 is disposed at the housing 10. The third guiding groove 181 is disposed at the light source aperture 102 of the housing 10. The third guiding groove 181 is generally arc-shaped. The third guiding post 182 is disposed at the outer side of the second protecting cover 172 of the light source protecting cover 17. The third guiding post 182 is slidably disposed in the third guiding groove 181. The number of the third guiding post 182 may correspond to the number of the third guiding groove 181. The driving mechanism 14 can drive the light source protecting cover 17 to move under the guidance of the third guiding mechanism 18, which will be described later.

Figure 8:
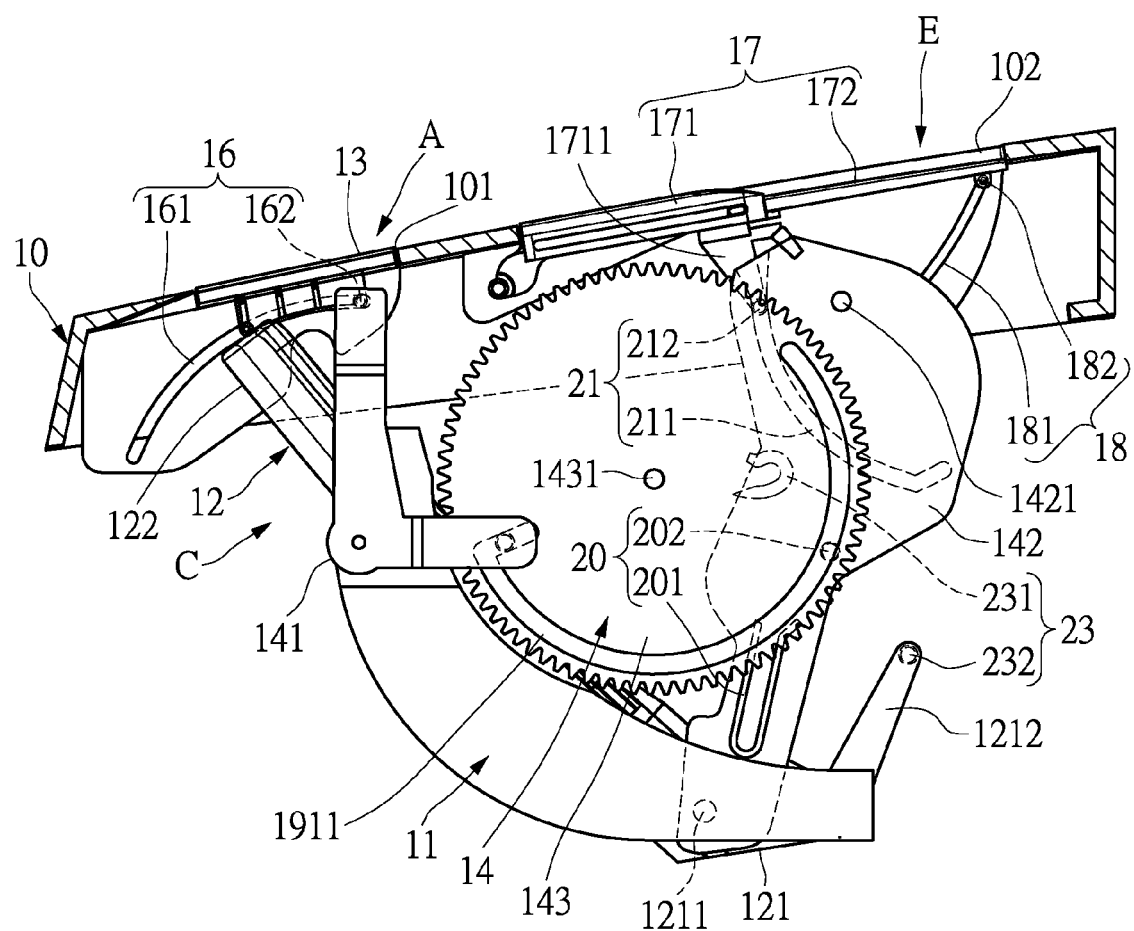
FIG. 8 is a schematic plan view (2) of the HUD device according to the present invention.

The driving mechanism 14 comprises a link 141, a lever 142 and a driving wheel 143 (as shown in FIGS. 7 and 8). One end of the link 141 is pivotally connected to the protecting cover 13. One end of the link 141 is pivotally connected to the protecting cover 13 through the first guiding post 162 of the first guiding mechanism 16, while the other end is engaged with the driving wheel 143. The link 141 is generally L-shaped. One end of the lever 142 is pivotally connected to the projecting board assembly 12. One end of the lever 142 is pivotally connected to the holder 121 of the projecting board assembly 12 through a pivot shaft 1211, while the other end is engaged with the light source protecting cover 17. The driving wheel 143 may be selectively engaged with the lever 142. The rotation of the driving wheel 143 may drive the link 141 and the lever 142 to move and thus drive the protecting cover 13, the projecting board assembly 12 and the light source protecting cover 17 to move, which will be described later.

In the present embodiment, as shown in FIGS. 3 and 4, the driving mechanism 14 is provided with two links 141, 141' facing each other, two levers 142, 142' facing each other, and two driving wheels 143, 143' facing each other. The two links 141, 141' are connected to the protecting cover 13 and are engaged with the driving wheels 143, 143', respectively, and the two levers 142, 142' are connected to the projecting board assembly 12 and the light source protecting cover 17 and can be engaged with the driving wheels 143, 143' respectively. Through the two links 141, 141', the two levers 142, 142' and the two driving wheels 143, 143', the movement of the protecting cover 13, the projecting board assembly 12 and the light source protecting cover 17 can be more stably driven.

Further, the link 141, the driving wheel 143, the lever 142, and the light source protecting cover 17 may be engaged with each other using engagement mechanisms. The detailed construction of the engagement mechanisms is described in detail below.

Figure 9:
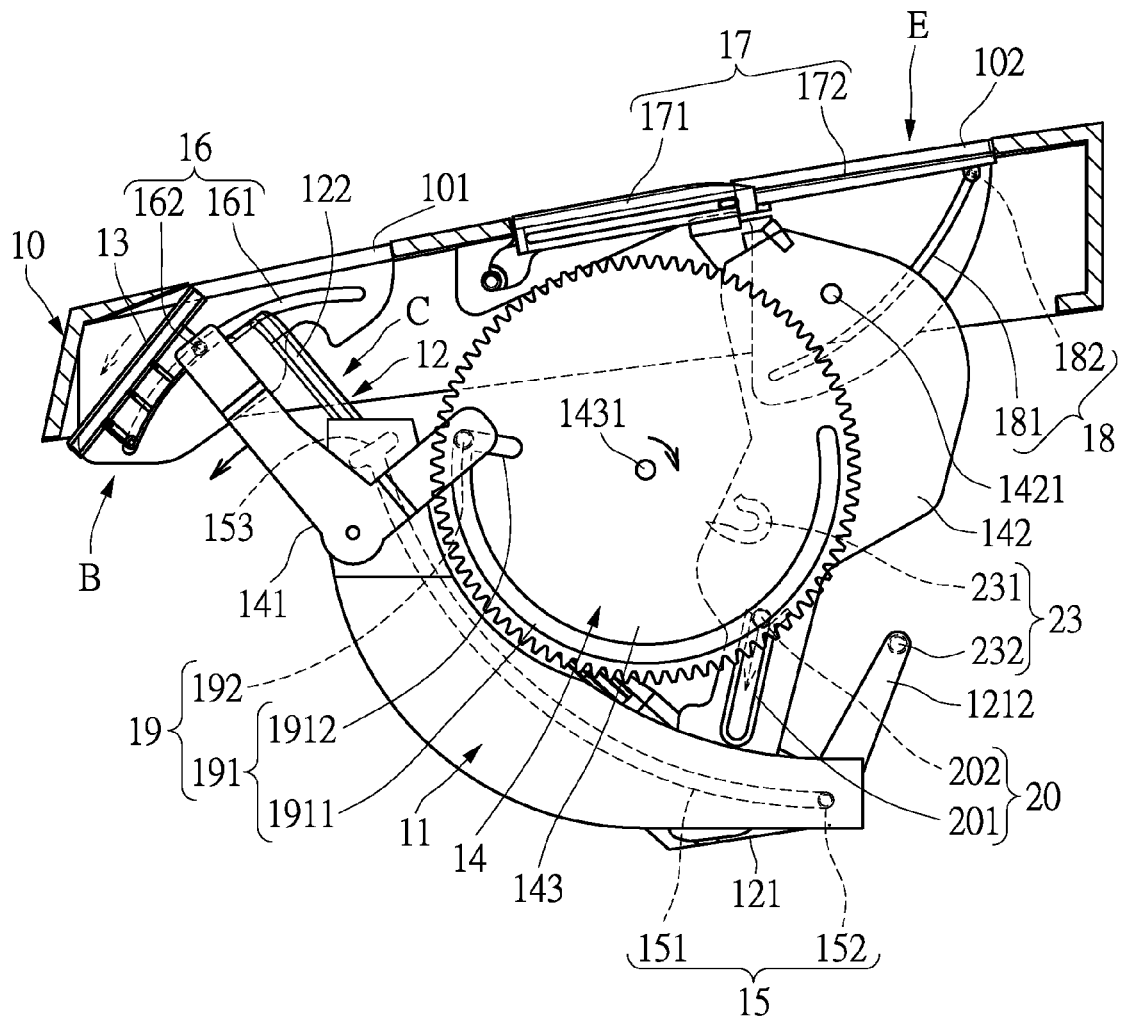
FIG. 9 is a schematic diagram (1) illustrating operation of the HUD device according to the present invention.

Firstly, a first engagement mechanism 19 (as shown in FIG. 7) is provided between the driving wheel 143 and the link 141 for providing movable engagement of the driving wheel 143 and the link 141, whereby the driving wheel 143 rotatably drives the link 141 to rotate forward or backward (please refer to FIG. 7 and FIG. 9).

Referring to FIGS. 5 and 6, in the present embodiment, the first engagement mechanism 19 comprises a first engagement groove 191 and a first engagement pin 192. The first engagement groove 191 is disposed at the driving wheel 143 and the first engagement pin 192 is disposed at the link 141. The first engagement groove 191 may be disposed at the outer side of the driving wheel 143, the first engagement pin 192 may be disposed at one end of the link 141 distal from the protecting cover 13, and the first engagement pin 192 is slidably disposed in the first engagement groove 191. The first engagement pin 192 is movable along the first engagement groove 191 for providing movable engagement of the driving wheel 143 and the link 141, whereby the driving wheel 143 rotatably drives, through the first engagement mechanism 19, the link 141 to rotate forward or backward (please refer to FIG. 7 and FIG. 9).

In particular, the first engagement groove 191 comprises an arc-shaped groove 1911 and an extension groove 1912, the arc-shaped groove 1911 is located at a periphery of the driving wheel 143, an end of the extension groove 1912 is in communication with a front end of the arc-shaped groove

1911, and a front end of the extension groove 1912 extends toward a rotation axis 1431 of the driving wheel 143. However, the present invention is not limited thereto and the extension groove 1912 may not extend toward the rotation axis 1431 of the driving wheel 143. That is to say, the shape and angle of the extension groove 1912 may be designed depending on the time required for rotating the driving wheel 143 to open or close the protecting cover 13, namely, designed depending on the angle of rotation of the driving wheel 143 and thus the distance of sliding of the protecting cover 13 along the curvature of the second guiding groove 161. The first engagement pin 192 is movable between the extension groove 1912 and the arc-shaped groove 1911, whereby the link 141 may be rotated forward and backward, namely, the link 141 may be rotated in a direction toward the rotation axis 1431 of the driving wheel 143 (please refer to FIG. 7) and in a direction away from the rotation axis 1431 of the driving wheel 143 (please refer to FIG. 10). Of course, the driving wheel 143 may alternatively rotatably drive the link 141 to move.

In the present embodiment, the number of the first engagement grooves 191 is two, and they are disposed at the driving wheels 143, 143' respectively, and the number of the first engagement pins 192 is two, and they are disposed at the links 141, 141' respectively.

Figure 10:
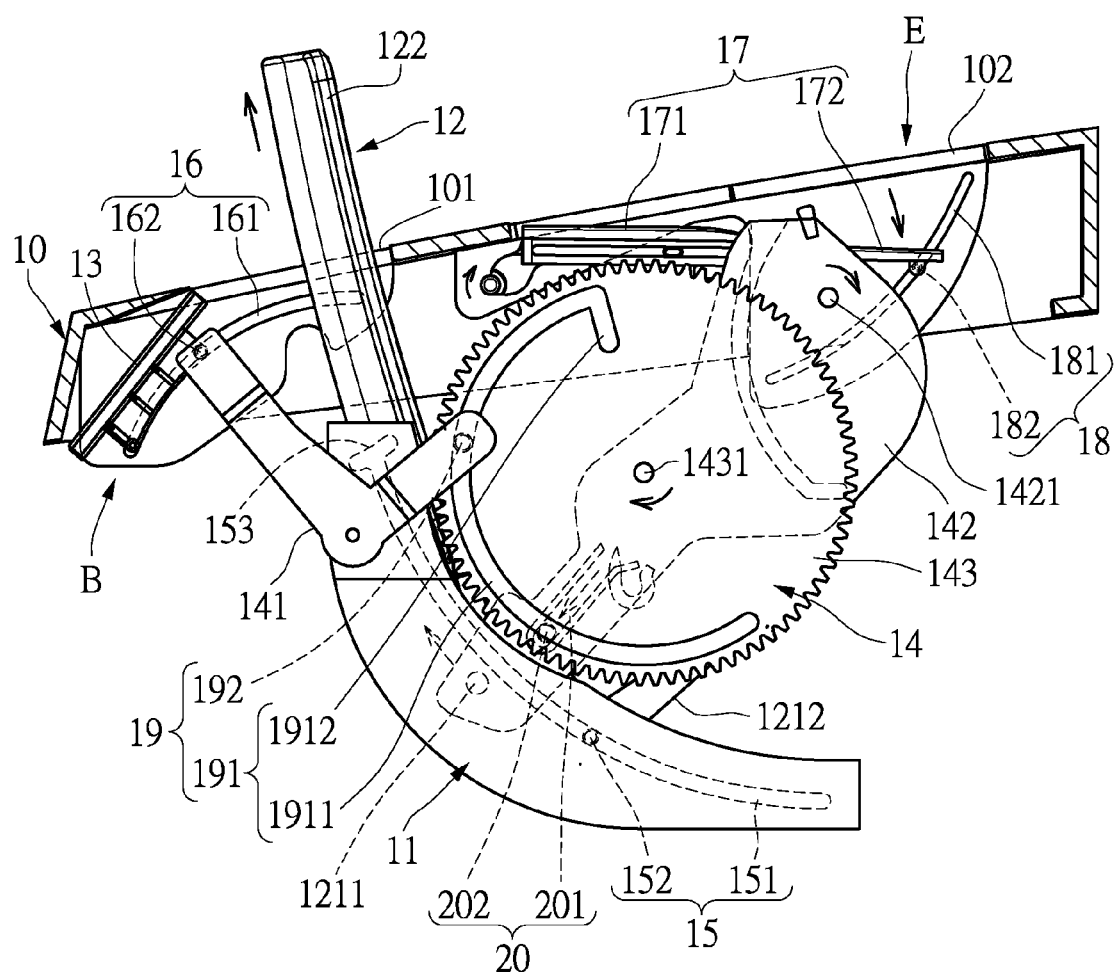
FIG. 10 is a schematic diagram (2) illustrating operation of the HUD device according to the present invention.

Also, a second engagement mechanism 20 (as shown in FIG. 7) is provided between the driving wheel 143 and the lever 142 for selective engagement of the driving wheel 143 and the lever 142, whereby the driving wheel 143 rotatably drives the lever 142 to swing upward or downward (please refer to FIG. 9 and FIG. 10).

In the present embodiment, the second engagement mechanism 20 comprises a second engagement groove 201 and a second engagement pin 202, the second engagement groove 201 may be disposed at the outer side of the lever 142 distal from a rotation axis 1421 of the lever 142, the second engagement groove 201 is generally elongated, and the second engagement pin 202 may be disposed at an inner side of the driving wheel 143 adjacent to the periphery of the driving wheel 143. The second engagement pin 202 may be selectively moved into the second engagement groove 201 to engage the driving wheel 143 to the lever 142, whereby the driving wheel 143 rotatably drives the lever 142 to swing upward or downward through the second engagement mechanism 20 (please refer to FIG. 9 and FIG. 10).

In the present embodiment, the number of the second engagement grooves 201 is two, and they are disposed at the levers 142, 142' respectively, and the number of the second engagement pins 202 is two, and they are disposed at the driving wheels 143, 143' respectively.

Figure 11:
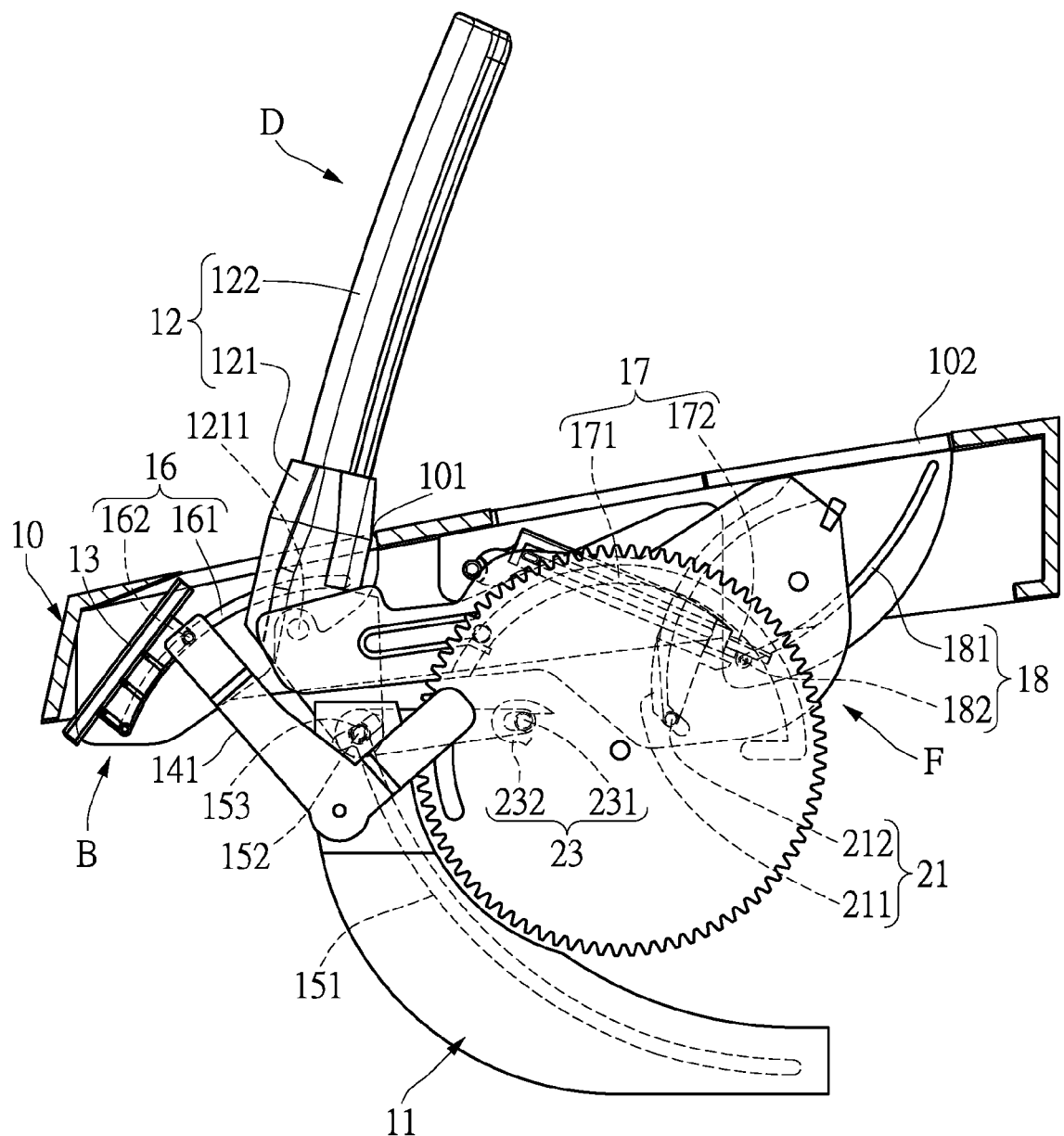
FIG. 11 is a schematic diagram (3) illustrating operation of the HUD device according to the present invention.

In addition, a third engagement mechanism 21 (as shown in FIG. 8) is provided between the lever 142 and the light source protecting cover 17 for providing movable engagement of the lever 142 and the light source protecting cover 17, such that when the driving wheel 143 drives the lever 142 to swing, the light source protecting cover 17 may also be driven to pivot (please refer to FIG. 8 and FIG. 11).

In the present embodiment, the third engagement mechanism 21 comprises a third engagement groove 211 and a third engagement pin 212, the third engagement groove 211 may be disposed at the inner side of the lever 142 adjacent to the rotation axis 1421 of the lever 142, the third engagement groove 211 is generally arc-shaped, and the third engagement pin 212 may be disposed at the outer side of the light source protecting cover 17. An engagement portion 1711 extends from the first protecting cover 171, the third engagement pin 212 may be disposed at the engagement portion 1711, and the third engagement pin 212 is slidably disposed in the third engagement groove 211. The third engagement pin 212 is movable along the third engagement groove 211 for providing movable engagement of the lever 142 and the light source protecting cover 17, such that the driving wheel 143 may rotatably drive the lever 142 to swing and thus drives the light source protecting cover 17 to pivot through the third engagement mechanism 21 (please refer to FIG. 8 and FIG. 11).

In the present embodiment, the number of the third engagement grooves 211 is two, and they are disposed at the inner sides of the levers 142, 142' respectively, and the number of the third engagement pins 212 is two, and they are disposed at the outer sides of the light source protecting cover 17 respectively.

Among the driving wheels 143, 143' and the levers 142, 142', a positioning mechanism 22 (refer to FIG. 12) may be further disposed between the driving wheel 143' and the lever 142' for positioning the projecting board assembly 12.

In the present embodiment, the positioning mechanism 22 comprises a positioning groove 221 and a positioning pin 222, the positioning groove 222 is disposed at the inner side of the driving wheel 143', and the positioning pin 222 is disposed at the outer side of the lever 142. The positioning pin 222 may be selectively moved into the positioning groove 221 to engage the driving wheel 143' to the lever 142', such that the projecting board assembly 12 may be positioned by the driving wheel 143' through the positioning mechanism 22.

In addition, among the driving wheels 143, 143', an angle adjustment mechanism 23 (refer to FIG. 13) may be further disposed between the driving wheel 143 and the projecting board assembly 12 for adjusting an inclination angle of the projecting board assembly 12, as described in detail below.

In the present embodiment, the angle adjustment mechanism 23 comprises an adjustment groove 231 and an adjustment pin 232. The adjustment groove 231 is generally C-shaped, the adjustment groove 231 is disposed at the inner side of the driving wheel 143, an adjustment portion 1212 extends from one side of the holder 121 of the projecting board assembly 12, the adjustment portion 1212 is perpendicular to the first guiding post 152, and the adjustment pin 232 may be disposed at the adjustment portion 1212. The adjustment pin 232 may be selectively moved into the adjustment groove 231 to engage the driving wheel 143 with the projecting board assembly 12, such that the driving wheel 143 rotatably drives the adjustment groove 231 and thus the adjustment pin 232, thereby driving the projecting board assembly 12 to adjust the inclination angle of the projecting board assembly 12 (please refer to FIG. 13 and FIG. 14).

Figure 13:
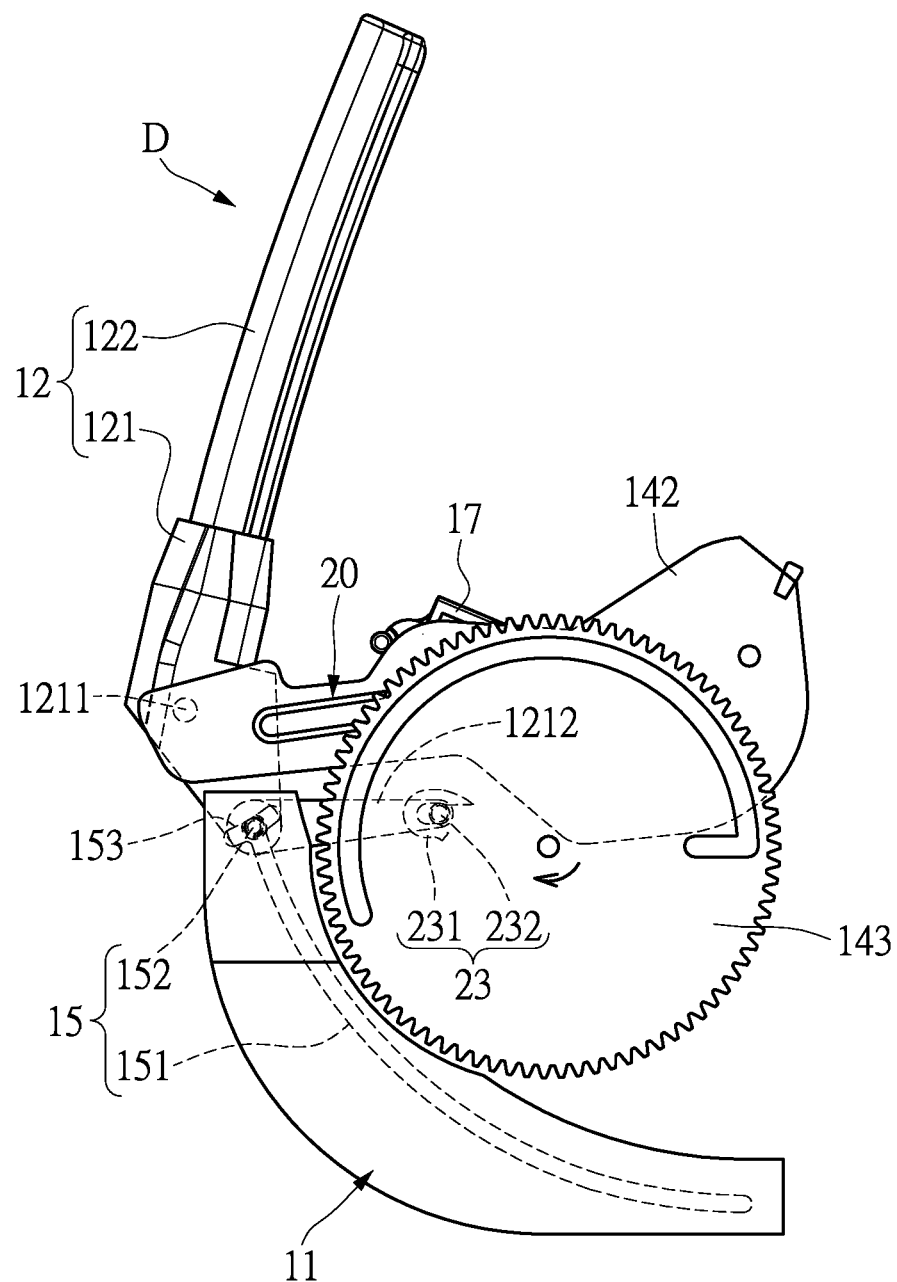
FIG. 13 is a schematic diagram (5) illustrating operation of the HUD device according to the present invention.
Figure 14:
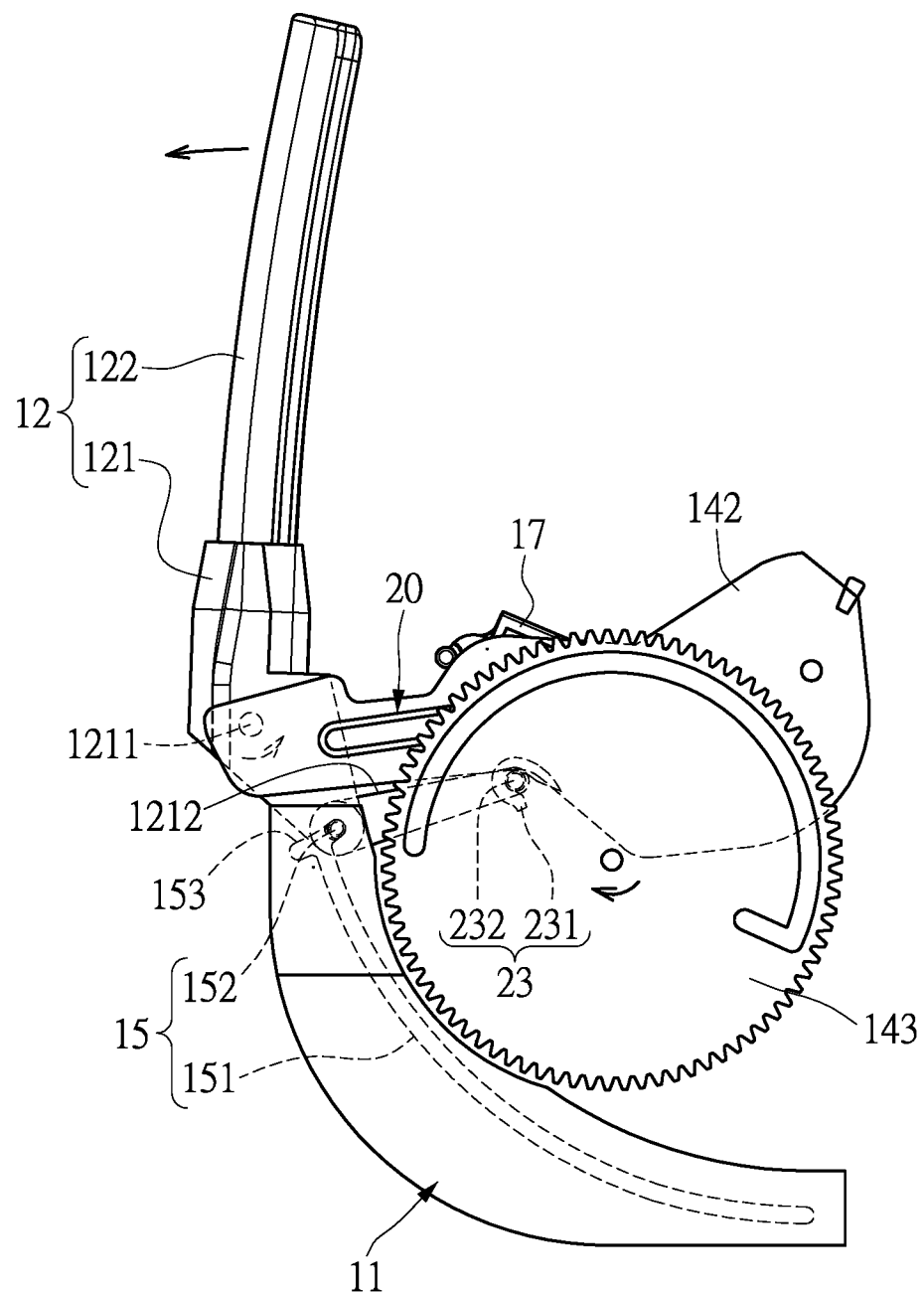
FIG. 14 is a schematic diagram (6) illustrating operation of the HUD device according to the present invention.

More particular, a retaining groove 153 is also provided at a front end of the first guiding groove 151, the retaining groove 153 is generally perpendicular to the first guiding groove 151, the first guiding post 152 may slide into the retaining groove 153 along the first guiding groove 151 and may slide in the retaining groove 153 with the movement of the adjustment pin 232, so as to limit, through the retaining groove 153, the sliding travel of the first guiding post 152, thereby limiting the inclination angle of the projecting board assembly 12 (please refer to FIG. 13 and FIG. 14).

Referring to FIG. 7 to FIG. 14, operation of the HUD device of the present invention is described below, starting from the position as shown in FIG. 7 and FIG. 8.

As shown in FIG. 7 and FIG. 8, the protecting cover 13 is in a closed position A (or referred to as a first closed position), which is located at the opening 101 of the housing 10; the projecting board assembly 12 is in a storing position C, which is located below the opening 101 of the housing 10; and the light source protecting cover 17 is in a closed position E (or referred to as a second closed position), which is located at the light source aperture 102 of the housing 10.

Referring to FIG. 7 and FIG. 9, when the driving wheel 143 rotates in a direction (for example, in a clockwise direction), the driving wheel 143 drives the link 141 to rotate, such that the protecting cover 13 is moved from the closed position A to an open position B, which is located distal from the opening 101 of the housing 10. In particular, the driving wheel 143 and the link 141 are linked through the first engagement mechanism 19, namely, when the driving wheel 143 rotates in the direction, the first engagement pin 192 is moved from the extension groove 1912 to the arc-shaped groove 1911 with the rotation of the driving wheel 143, whereby the link 141 rotates in a direction away from the driving wheel 143 to drive the protecting cover 13 to move in a direction away from the opening 101, such that the projecting board 122 of the projecting board assembly 12 is exposed at the opening 101.

Then, referring to FIG. 10 and FIG. 11, when the driving wheel 143 continues to rotate in the direction, the driving wheel 143 drives the lever 142 to swing upward, such that the projecting board assembly 12 is moved from the storing position C to a displaying position D, which is located outside the housing 10. In particular, the driving wheel 143 and the lever 142 are linked through the second engagement mechanism 20, namely, when the driving wheel 143 continues to rotate in the direction, the second engagement pin 202 is moved into the second engagement groove 201 with the rotation of the driving wheel 143, to engage the driving wheel 143 to the lever 142 and thus drive the lever 142 to swing upward, whereby the projecting board assembly 12 is raised by the lever 142 to cause the projecting board assembly 12 to slide upward and extend outward through the opening 101 to be outside the housing 10 (as shown in FIG. 11).

Meanwhile, referring to FIG. 8 and FIG. 11, the light source protecting cover 17 is pivoted from the closed position E to an open position F, which is located distal from the light source aperture 102 of the housing 10. In particular, the lever 142 and the light source protecting cover 17 are linked through the third engagement mechanism 21, namely, when the driving wheel 143 drives the lever 142 to swing upward, the third engagement pin 212 is moved downward from the front end to the end of the third engagement groove 211 along with the upward swinging of the lever 142, such that the light source protecting cover 17 is pivoted downward to expose the light source aperture 102 (as shown in FIG. 11).

Figure 12:
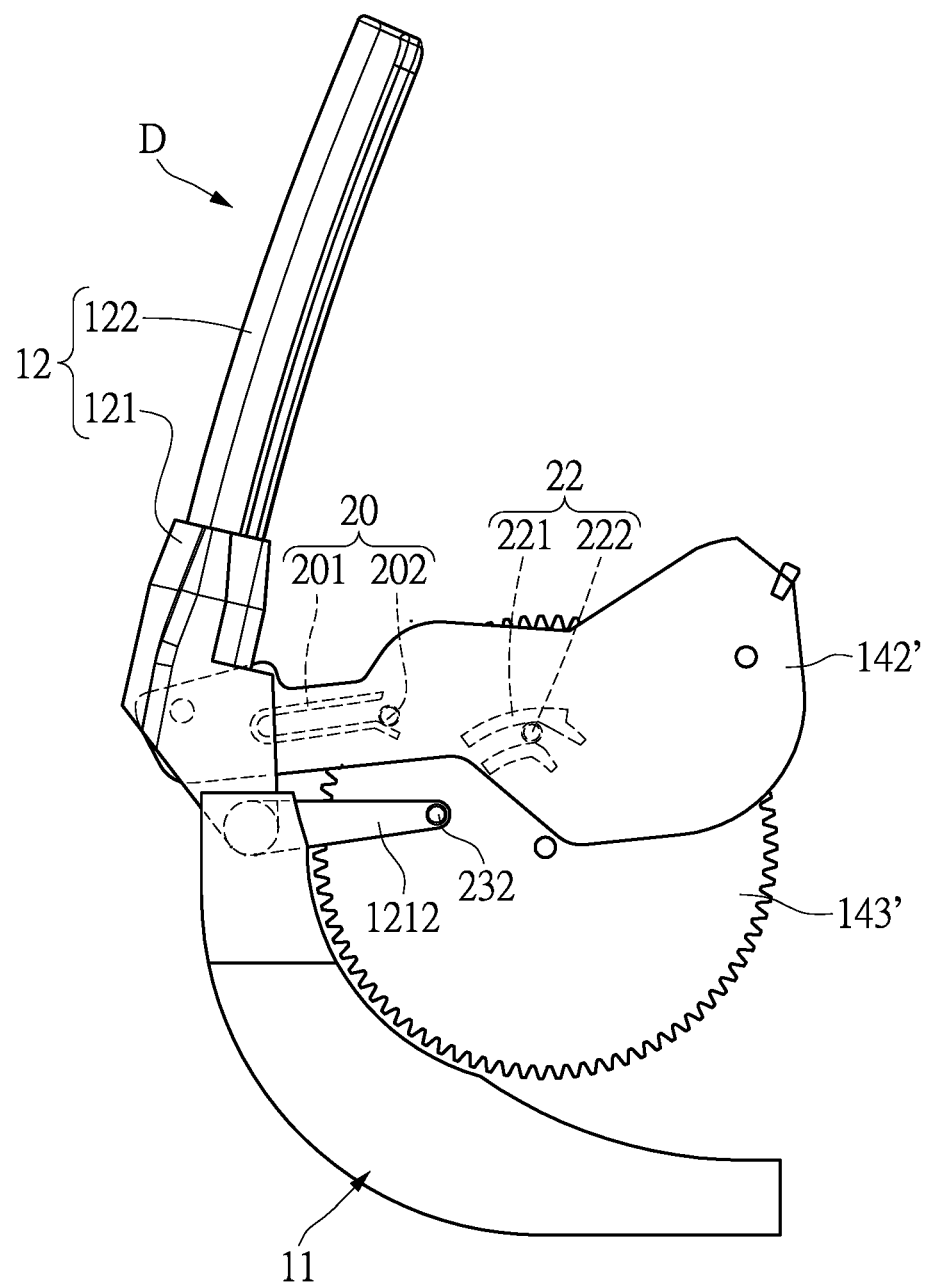
FIG. 12 is a schematic diagram (4) illustrating operation of the HUD device according to the present invention.

Then, as shown in FIG. 12 (for conciseness, only the guiding base 11, the projecting board assembly 12, the lever 142', the driving wheel 143', the second engagement mechanism 20, and the positioning mechanism 22 are shown in the schematic view), when the projecting board assembly 12 reaches the displaying position D, the second engagement pin 202 is detached from the second engagement groove 201, and at this time, the projecting board assembly 12 is positioned at the displaying position D by the driving wheel 143' and the lever 142' through the positioning mechanism 22. That is to say, when the second engagement pin 202 is detached from the second engagement groove 201, the positioning pin 222 has been moved into the positioning groove 221, such that the driving wheel 143' may support the lever 142' and the lever 142' does not swing downward because of the detachment of the second engagement pin 202, thereby positioning the projecting board assembly 12 at the displaying position D.

In addition, as shown in FIG. 13 and FIG. 14 (for conciseness, only the guiding base 11, the projecting board assembly 12, the lever 142, the driving wheel 143, the first guiding mechanism 15, the light source protecting cover 17, and the second engagement mechanism 20 are shown in the schematic views), when the projecting board assembly 12 is at the displaying position D, the driving wheel 143 and the projecting board assembly 12 are linked through the angle adjustment mechanism 23 to adjust the inclination angle of the projecting board assembly 12 at the displaying position D. That is to say, the adjustment pin 232 is moved into the adjustment groove 231 to engage the driving wheel 143 with the projecting board assembly 12, whereby when the driving wheel 143 continues to rotate (as shown in FIG. 14), the adjustment pin 232 is driven by the adjustment groove 231, thereby driving the holder 121 of the projecting board assembly 12, and at this time, the holder 121 of the projecting board assembly 12 is pivoted about the pivot shaft 1211 to enable the inclination angle of the projecting board 122 to be adjusted to a suitable viewing position, and the first guiding post 152 is slid into the retaining groove 153 to limit the inclination angle of the projecting board assembly 12, thereby avoiding an overly large inclination angle.

It should be understood that, when the driving wheel 143 rotates in another direction (in a counterclockwise direction), the driving wheel 143 may drive the lever 142 to swing downward, such that the projecting board assembly 12 is moved from the displaying position D to the storing position C and the light source protecting cover 17 is pivoted from the open position F to the closed position E, and the driving wheel 143 may drive the link 141 to rotate, such that the protecting cover 13 is moved from the open position B to the closed position A.

The projecting board assembly 12 of the present invention comprises the holder 121 and the projecting board 122. The protecting cover 13 can cover the projecting board 122 of the projecting board assembly 12, thereby achieving the effect of protecting the projecting board 122 to prevent the projecting board 122 from being exposed to sunshine or adhered with dust. In addition, the rotation of the driving wheel 143 may drive the link 141 and the lever 142 to move and thus drive the protecting cover 13 and the projecting board assembly 12 to move. As such, only one driving wheel 143 is required for driving all the objects, and thus the arrangement of the driving mechanism 14 is relatively easy, so as to simplify the structure and reduce cost.

Furthermore, according to the present invention, the light source protecting cover 17 is further disposed on the housing 10, and the other end of the lever 142 is engaged with the light source protecting cover 17, such that the rotation of the driving wheel 143 may drive the lever 142 to move and thus drive the light source protecting cover 17 to move. Thus, no other driving mechanisms are required for driving the light source protecting cover 17, which also simplifies the structure and reduces cost.

However, the description above is only preferred embodiments of the present invention and is not intended to limit the scope of the present invention. All equivalent changes made according to the specification and drawings of the present invention falls within the scope of the present invention.

What is claimed is:
1. A head-up display (HUD) device, comprising:
a housing provided with an opening;

a guiding base located below the housing;
a projecting board assembly disposed at the guiding base, the projecting board assembly being slidably movable between a storing position located below the opening of the housing and a displaying position located outside the housing, the projecting board assembly comprising a holder and a projecting board disposed on the holder;
a protecting cover disposed at the housing, the protecting cover being slidably movable between a closed position located at the opening of the housing and an open position located distal from the opening of the housing; and
a driving mechanism comprising a link, a lever, and a driving wheel, wherein one end of the link is pivotally connected to the protecting cover, another end of the link is engaged with the driving wheel, one end of the lever is pivotally connected to the projecting board assembly, and the driving wheel is selectively engaged with the lever, such that when the driving wheel rotates, the link and the lever are driven to move, thereby driving the protecting cover and the projecting board assembly to move; wherein when the driving wheel rotates in a direction, the driving wheel drives the link to rotate such that the protecting cover is moved from the closed position to the open position, and the driving wheel drives the lever to swing such that the projecting board assembly is moved from the storing position to the displaying position.

2. The HUD device of claim 1, wherein a first guiding mechanism is provided between the projecting board assembly and the guiding base for guiding movement of the projecting board assembly, the first guiding mechanism comprises a first guiding groove and a first guiding post, the first guiding groove is disposed at the guiding base, the first guiding post is disposed at the holder, and the first guiding post is slidably disposed in the first guiding groove.

3. The HUD device of claim 2, wherein a second guiding mechanism is disposed between the protecting cover and the housing for guiding movement of the protecting cover, the second guiding mechanism comprises a second guiding groove and a second guiding post, the second guiding groove is disposed at the housing, the second guiding post is disposed at the protecting cover, and the second guiding post is slidably disposed in the second guiding groove.

4. The HUD device of claim 1, wherein a first engagement mechanism is provided between the driving wheel and the link for providing movable engagement of the driving wheel and the link, the first engagement mechanism comprises a first engagement groove and a first engagement pin, the first engagement groove is disposed at the driving wheel, the first engagement pin is disposed at the link, and the first engagement pin is slidably disposed in the first engagement groove.

5. The HUD device of claim 4, wherein the first engagement groove comprises an arc-shaped groove and an extension groove, the arc-shaped groove is located at a periphery of the driving wheel, an end of the extension groove is in communication with a front end of the arc-shaped groove, and a front end of the extension groove extends toward a rotation axis of the driving wheel.

6. The HUD device of claim 4, wherein a second engagement mechanism is provided between the driving wheel and the lever for selective engagement of the driving wheel and the lever, the second engagement mechanism comprises a second engagement groove and a second engagement pin, the second engagement groove is disposed at the lever, the second engagement pin is disposed at the driving wheel, and the second engagement pin is selectively moved into the second engagement groove to engage the driving wheel to the lever.

7. The HUD device of claim 1, wherein a positioning mechanism is further disposed between the driving wheel and the lever for positioning the projecting board assembly at the displaying position, the positioning mechanism comprises a positioning groove and a positioning pin, the positioning groove is disposed at the driving wheel, the positioning pin is disposed at the lever, and the positioning pin is selectively moved into the positioning groove to position the projecting board assembly at the displaying position.

8. The HUD device of claim 1, wherein an angle adjustment mechanism is further disposed between the driving wheel and the projecting board assembly for adjusting an inclination angle of the projecting board assembly at the displaying position, the angle adjustment mechanism comprises an adjustment groove and an adjustment pin, the adjustment groove is disposed at the driving wheel, an adjustment portion extends from one side of the holder of the projecting board assembly, the adjustment pin is disposed at the adjustment portion, the adjustment pin is selectively moved into the adjustment groove, and when the adjustment pin is driven by the adjustment groove, the projecting board assembly is also driven to adjust the inclination angle of the projecting board assembly at the displaying position.

9. A head-up display (HUD) device, comprising:
a housing provided with an opening and a light source aperture;
a guiding base located below the housing;
a projecting board assembly disposed at the guiding base, the projecting board assembly being slidably movable between a storing position located below the opening of the housing and a displaying position located outside the housing, the projecting board assembly comprising a holder and a projecting board disposed on the holder;
a protecting cover disposed at the housing, the protecting cover being slidably movable between a first closed position located at the opening of the housing and a first open position located distal from the opening of the housing;
a light source protecting cover disposed at the housing, the light source protecting cover being pivotally movable between a second closed position located at the light source aperture of the housing and a second open position located distal from the light source aperture of the housing; and
a driving mechanism, comprising a link, a lever and a driving wheel, wherein one end of the link is pivotally connected to the protecting cover, another end of the link is engaged with the driving wheel, one end of the lever is pivotally connected to the projecting board assembly, another end of the lever is engaged with the light source protecting cover, and the driving wheel is capable of being engaged with the lever, such that when the driving wheel rotates, the link and the lever are driven to move, thereby driving the protecting cover, the projecting board assembly and the light source protecting cover to move; wherein when the driving wheel rotates in a direction, the driving wheel drives the link to rotate such that the protecting cover is moved from the first closed position to the first open position, and the driving wheel drives the lever to swing such that the projecting board assembly is moved from the storing position to the displaying position and the light source protecting cover is pivoted from the second closed position to the second open position.

10. The HUD device of claim 9, wherein a first guiding mechanism is provided between the projecting board assembly and the guiding base for guiding movement of the projecting board assembly, the first guiding mechanism comprises a first guiding groove and a first guiding post, the first guiding groove is disposed at the guiding base, the first guiding post is disposed at the holder, and the first guiding post is slidably disposed in the first guiding groove.

11. The HUD device of claim 10, wherein a second guiding mechanism is disposed between the protecting cover and the housing for guiding movement of the protecting cover, the second guiding mechanism comprises a second guiding groove and a second guiding post, the second guiding groove is disposed at the housing, the second guiding post is disposed at the protecting cover, and the second guiding post is slidably disposed in the second guiding groove.

12. The HUD device of claim 11, wherein a third guiding mechanism is disposed between the light source protecting cover and the housing for guiding movement of the light source protecting cover, the third guiding mechanism comprises a third guiding groove and a third guiding post, the third guiding groove is disposed at the housing, the third guiding post is disposed at the light source protecting cover, and the third guiding post is slidably disposed in the third guiding groove.

13. The HUD device of claim 9, wherein a first engagement mechanism is provided between the driving wheel and the link for providing movable engagement of the driving wheel and the link, the first engagement mechanism comprises a first engagement groove and a first engagement pin, the first engagement groove is disposed at the driving wheel, the first engagement pin is disposed at the link, and the first engagement pin is slidably disposed in the first engagement groove.

14. The HUD device of claim 13, wherein the first engagement groove comprises an arc-shaped groove and an extension groove, the arc-shaped groove is located at a periphery of the driving wheel, an end of the extension groove is in communication with a front end of the arc-shaped groove, and a front end of the extension groove extends toward a rotation axis of the driving wheel.

15. The HUD device of claim 13, wherein a second engagement mechanism is provided between the driving wheel and the lever for selective engagement of the driving wheel and the lever, the second engagement mechanism comprises a second engagement groove and a second engagement pin, the second engagement groove is disposed at the lever, the second engagement pin is disposed at the driving wheel, and the second engagement pin is selectively moved into the second engagement groove to engage the driving wheel to the lever.

16. The HUD device of claim 15, wherein a third engagement mechanism is provided between the lever and the light source protecting cover for providing movable engagement of the lever and the light source protecting cover, the third engagement mechanism comprises a third engagement groove and a third engagement pin, the third engagement groove is disposed at the lever, the third engagement pin is disposed at the light source protecting cover, and the third engagement pin is slidably disposed in the third engagement groove.

17. The HUD device of claim 9, wherein a positioning mechanism is further disposed between the driving wheel and the lever for positioning the projecting board assembly at the displaying position, the positioning mechanism comprises a positioning groove and a positioning pin, the positioning groove is disposed at the driving wheel, the positioning pin is disposed at the lever, and the positioning pin is selectively moved into the positioning groove to position the projecting board assembly at the displaying position.

18. The HUD device of claim 9, wherein an angle adjustment mechanism is further disposed between the driving wheel and the projecting board assembly for adjusting an inclination angle of the projecting board assembly at the displaying position, the angle adjustment mechanism comprises an adjustment groove and an adjustment pin, the adjustment groove is disposed at the driving wheel, an adjustment portion extends from one side of the holder of the projecting board assembly, the adjustment pin is disposed at the adjustment portion, the adjustment pin is selectively moved into the adjustment groove, and when the adjustment pin is driven by the adjustment groove, the projecting board assembly is also driven to adjust the inclination angle of the projecting board assembly at the displaying position.

* * * * *